United States Patent

[11] 3,617,886

| | | |
|---|---|---|
| [72] | Inventor | John V. Werme<br>Painesville, Ohio |
| [21] | Appl. No. | 748,072 |
| [22] | Filed | July 26, 1968 |
| [45] | Patented | Nov. 2, 1971 |
| [73] | Assignee | Bailey Meter Company |

[54] TRANSDUCER OPEN-CIRCUIT FAILURE DETECTOR
7 Claims, 1 Drawing Fig.

[52] U.S. Cl. .................................................. 324/110,
73/359, 324/51, 340/256
[51] Int. Cl. ...................................................... G01r 1/00,
G01r 31/02
[50] Field of Search ........................................... 324/110,
51, 106; 340/256; 73/359

[56] References Cited
UNITED STATES PATENTS

| 2,576,892 | 11/1951 | Stanton ........................ | 73/343 |
| 3,054,951 | 9/1962 | Richard ....................... | 324/106 |
| 3,120,758 | 2/1964 | Craddock et al. ............. | 73/343 |
| 3,468,164 | 8/1966 | Sutherland ................... | 324/51 X |
| 3,521,164 | 7/1970 | Richman ..................... | 324/106 |

FOREIGN PATENTS

| 897,938 | 9/1960 | Great Britain ................ | 324/51 |

Primary Examiner—Rudolph V. Rolinec
Assistant Examiner—Ernest F. Karlsen
Attorney—John F. Luhrs ABSTRACT: A high-impedance, open-circuit detector having a thermocouple generating a voltage proportional to the temperature level established by a controllable heater. The detector circuit voltage is applied in parallel with a low-impedance transducer measuring circuit at the input of a transducer monitoring circuit. The high-impedance detector voltage circuit is connected with the voltage polarity in reverse to the polarity of the transducer measuring circuit. The transducer measuring circuit is unaffected by the high-impedance detector voltage, and, therefore, the monitoring circuit responds only to the measuring circuit, while electrical continuity is maintained between the circuits. In the event the measuring circuit is electrically opened, the detector circuit will apply a reverse polarity voltage to the measuring circuit causing said circuit to indicate a condition wholly inconsistent with the range of the measuring transducer. This response to the detector voltage is an indication of open-circuit failure in the transducer measuring circuit.

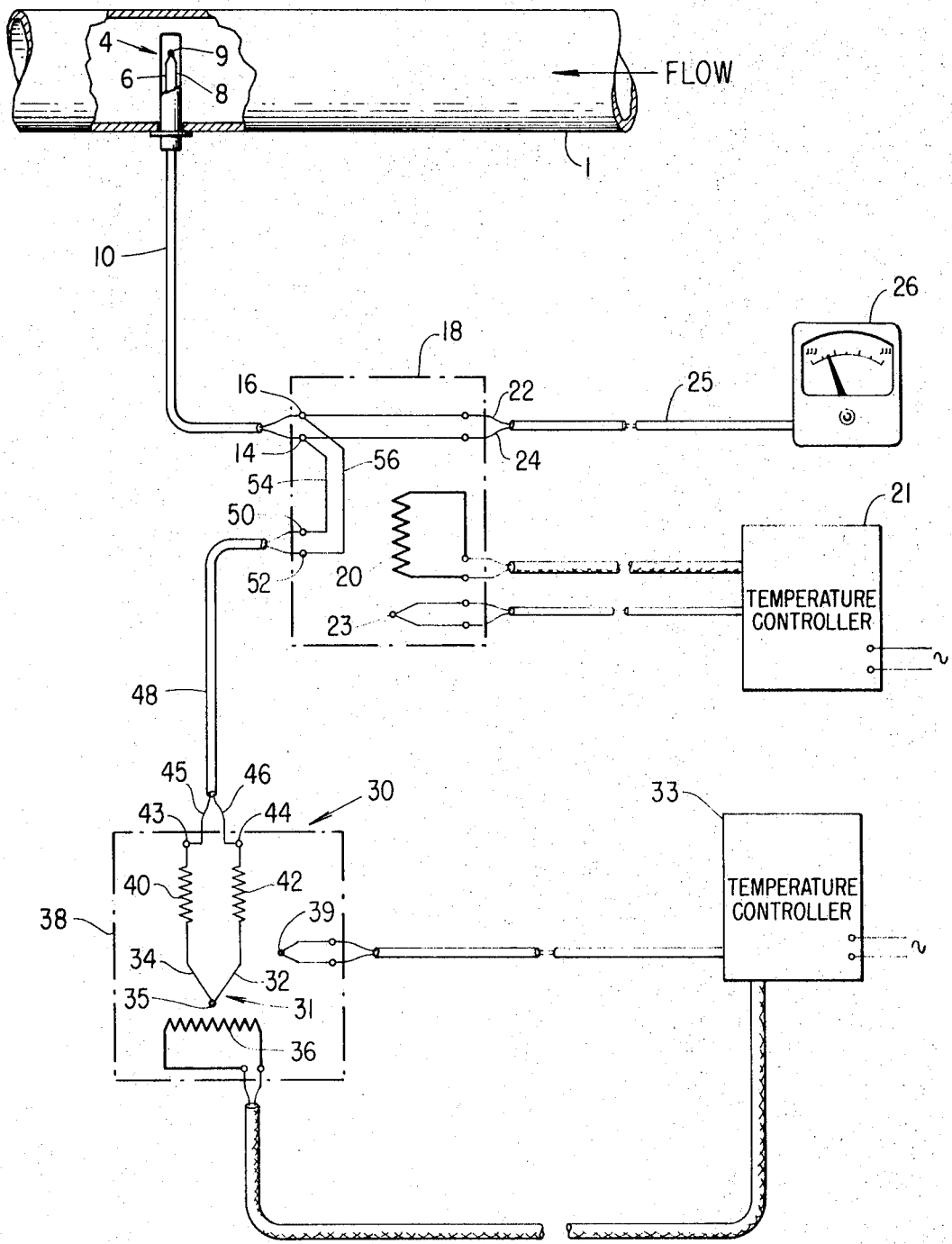

TRANSDUCER OPEN-CIRCUIT FAILURE DETECTOR

BACKGROUND OF THE INVENTION

1. Field of the Invention

This invention relates generally to measuring circuit failure-detecting circuits and more particularly to a circuit which responds to an open-circuit failure of the measuring circuit by transmitting a voltage signal of reverse polarity.

2. Description of the Prior Art

Inability to distinguish a transducer signal which is a true representation of the measured variable and an erroneous signal resulting from open-circuit failure of the transducer circuit has resulted in several circuits aimed at positively identifying transducer open-circuit failure.

One class of such detector circuits employs high-impedance voltage-generating circuits which are connected in parallel with the transducer circuit to the input of a monitoring circuit. The polarity of the two input voltage signals are reversed. The detector circuit, due to its high impedance, has no effect on the low-impedance transducer circuit while the transducer circuit remains intact, but in the event the transducer circuit opens, thereby exhibiting infinite impedance, the detector voltage will drive the monitoring circuit out of the normal signal range of the measuring transducer. Although this method of detecting open-circuit transducer failure has proven valid, the circuits presently employed have proven to be less than satisfactory.

Some circuits utilize batteries as the source of detector circuit voltage, but the deterioration of battery potential, coupled with the cost of providing a separate battery for each transducer circuit makes this technique undesirable.

Other circuits overcome the effect of battery deterioration and the need for providing many individual voltage sources by utilizing a single power supply which can provide constant voltage indefinitely. The major drawback of this technique is the loss of isolation between each detector circuit due to the transformer coupling in the power supply. As a result of this coupling, the detector circuits are subjected to erroneous signals and noise which adversely affect the operation of each detector circuit.

The subject invention is a detector circuit which provides the isolation of the battery circuit technique and the stability of the power supply circuit.

SUMMARY OF THE INVENTION

The subject of the invention is a high-impedance voltage circuit consisting of a thermocouple generating a voltage signal as a function of heater controlled temperature. This voltage signal is applied to a signal-monitoring circuit in opposition to a low-impedance measuring circuit voltage signal. A loss of the measuring circuit voltage due to an open circuit will result in the high-impedance voltage signal driving the monitoring circuit to a condition indicating failure of the measuring circuit.

BRIEF DESCRIPTION OF THE DRAWING

The drawing is a schematic illustration of a typical embodiment of the invention.

DESCRIPTION OF THE PREFERRED EMBODIMENT

A typical embodiment of my invention is illustrated in the drawing. It will be apparent from the discussion to follow that the selection of thermocouple 4 as a measuring transducer was arbitrary, and any transducer would be equally suitable.

The thermocouple is a widely used thermoelectric element composed of two dissimilar wires welded together at one end forming a thermocouple junction. When the temperature at the welded junction changes, an electrical potential is generated in the circuit and appears at the free ends of the wire. The combination of wires selected to form a thermocouple is dictated by the temperature range to which the thermocouple is to respond and the signal value desired at a given temperature.

In the drawing, thermocouple 4 is shown as comprising the iron wire 6 and constantan wire 8 welded together at one end forming sensing junction 9 with the free ends of said wires extending through cable 10 and terminating at input terminals 14 and 16 respectively of constant-temperature reference system 18. The measuring junction 9 forms one end of a loop in which a thermoelectric voltage is developed when a temperature difference exists between the junction 9 and the input terminals 14 and 16. Thus, in measuring an unknown temperature, as represented by the temperature of fluid in pipe 1, it is not sufficient to determine the voltage in the loop. It is also necessary to know the temperature at the terminals 14 and 16. Reference system 18, a device well known in the art, provides a constant-temperature reference by means of a heater 20, operated by a controller 21, sensitive to the temperature within the reference system as determined by a thermocouple 23. The thermoelectric voltage having been established relative to a constant-temperature reference, the resulting voltage signal is transmitted by wires 22 and 24 of cable 25 to temperature indicator 26. The wires 22 and 24, preferably being of identical material, are equally sensitive to temperature changes and will not, therefore, develop an erroneous thermoelectric signal. The temperature reference circuit thus described represents a conventional method of transmitting the thermoelectric voltage of a thermocouple to a measuring or indicating circuit. Although, for the purposes of clarity, the discussion is limited to a single channel of temperature data, it is common to utilize a temperature reference system which will accommodate many channels of thermocouple voltages.

In such multichannel systems, it is often necessary for the measuring circuit to scan the various channels and sample the voltage values sequentially. In such a system, the failure of a measuring thermocouple, as represented by an open circuit in the thermocouple, often goes undetected. The inability to detect such a failure often results in the acquisition of erroneous data in the form of false temperature readings. The mere fact that an open-circuit thermocouple would result in the voltage signal diminishing to a false value, this false value may represent a plausible temperature reading; and, as such, may not be interpreted as an indication of thermocouple failure. Detector circuit 30 provides positive instantaneous indication of an open circuit in the thermocouple circuit. As noted previously, the detector circuit 30 is equally applicable to other transducer circuits of comparable signal range.

Detector circuit 30 consists basically of thermocouple 31 and heater 36 enclosed in thermal insulated block 38. For the purpose of discussion, thermocouple 31 is formed by iron wire 32 and constantan wire 34 welded together at one end forming sensing junction 35. The wire combination selected for thermocouple 31 is dictated by the detector voltage signal range required for the specific application. By means of temperature controller 33 regulating the power applied to heater 36, in accordance with the block temperature as monitored by thermocouple 39, the internal temperature of block 38 is regulated to maintain the thermoelectric voltage generated by thermocouple 31 at a desired value.

The output impedance of detector circuit 30 is maintained extremely high by resistors 40 and 42 which are connected between the free ends of thermocouple wires 34 and 32 respectively and detector circuit output terminals 43 and 44. Detector circuit 30 is connected to temperature reference system 18 by the copper leads 45 and 46 of cable 48 which extends from detector terminals 43 and 44 to temperature reference system terminals 50 and 52 respectively.

The high-impedance voltage signal established by detector circuit 30 and transmitted to temperature reference system terminals 50 and 52 is connected across measuring thermocouple 4 input terminals 14 and 16 by wires 54 and 56 such that the polarity of the detector circuit voltage is the reverse of the normal polarity of the measuring thermocouple 4 voltage signal. The ratio of the circuit impedance of the measuring thermocouple 4 and the detector circuit 30 is approximately 1:1000 and, therefore, circuit 30 exhibits an extremely high circuit impedance when thermocouple 4 is electrically intact. The detector circuit resistors 40 and 42 function as isolating resistors, thereby preventing the detector voltage from influencing the voltage signal transmitted from measuring thermocouple 4 to indicator 26 when thermocouple 4 circuit is electrically closed.

In the event, however, the measuring thermocouple circuit fails to an open state, the detector circuit voltage developed by thermocouple 31 will be impressed as a reverse polarity voltage across the inputs of indicator 26 causing said indicator to be driven to a reading totally inconsistent with the signal range of measuring thermocouple 4. The detector voltage applied to indicator 26 is a function of the temperature of block 38 which is controlled by temperature controller 33.

It is apparent that the detector circuit 30 can be expanded to accommodate additional measuring transducers by increasing the number of detector thermocouples so that an individual detector thermocouple is provided for each measuring transducer. Heater 36 is sufficient to function as the heating means for a plurality of detector thermocouples. Each detector thermocouple is electrically isolated from all other detector thermocouples as well as from heater 36, and each detector thermocouple can, therefore, be referred to as electrically "floating." As a result of this electrical isolation of the detector thermocouples, said thermocouples are unaffected by extraneous electrical signals, noise, or ground loops.

While only one embodiment of the invention has been herein shown and described, it will be apparent to those skilled in the art that many changes may be made in the circuit without departing from the scope of the invention as defined in the appended claims.

What I claim as new and desire to secure by Letters Patent of the United States is:

1. An open-circuit detecting circuit for detecting the open-circuit failure of a low-impedance measuring transducer, said detecting circuit comprising: a transducer-monitoring circuit, a high-impedance temperature-produced source of voltage connected in parallel with the voltage output of said measuring transducer to the input terminal of said transducer monitoring circuit, said voltage inputs to said monitoring circuit being of opposite polarity, said high-impedance voltage source effectively representing an open circuit to both the monitoring circuit and the measuring transducer circuit while said measuring transducer remains electrically closed, but representing a source of reverse polarity voltage to said monitoring circuit when said measuring transducer circuit fails in an electrically open state;
   means for maintaining the parallel connecting junctions of said measuring transducer and said temperature-produced voltage source at a predetermined temperature, whereby the reverse polarity voltage signal applied to the monitoring circuit during measuring transducer open-circuit condition is a positive indication of measuring transducer open-circuit failure.

2. An open-circuit detecting circuit as claimed in claim 1, wherein said temperature-produced source of voltage includes:
   a heating means;
   a temperature transducer means responsive to said heating means and generating a voltage as a function of the heat generated by said heating means; and
   isolating means connected to said temperature transducer to isolate the voltage generated by said temperature transducer from the measuring transducer circuit and the transducer monitoring circuit while said measuring transducer is electrically closed.

3. An open-circuit detecting circuit as claimed in claim 2 wherein said temperature transducer means is a thermocouple.

4. An open-circuit detecting circuit as claimed in claim 2 wherein said isolating means are electrical resistors.

5. An open-circuit detecting circuit as claimed in claim 2 further including a temperature control means connected to said heating means to regulate the heat generated by said heating means so as to establish a desired temperature transducer voltage value.

6. A circuit for detecting the open-circuit failure of a measuring transducer having a low impedance, comprising:
   means for monitoring the measuring transducer, said monitoring means having a pair of input terminals connected to the measuring transducer with reference polarity;
   a detecting transducer capable of producing a temperature-induced output voltage when coupled to a reference temperature;
   means for direct coupling the output voltage from said detecting transducer in parallel connection with the measuring transducer to the input terminals of said monitoring means but with a polarity the reverse of the reference polarity, said direct coupling means raising the output impedance of said detecting transducer to a high value with respect to the output impedance of said measuring transducer so that an open circuit in the measuring transducer is indicated by the output voltage of said detecting transducer being applied substantially across the input terminals of said monitoring means with the reverse to reference polarity and the output voltage of said detecting transducer otherwise being substantially negligible compared to the voltage applied to said monitoring means from the measuring transducer;
   and means for compensating for the junction temperature at the parallel connection to the input terminals of said monitoring means.

7. The circuit for detecting the open-circuit failure as set forth in claim 6, additionally including means for maintaining the detecting transducer and the direct-coupling means at a predetermined temperature in order to produce a constant value of temperature-induced output voltage.

* * * * *